March 25, 1952  G. L. SCHWARZ  2,590,276

FURNACE THERMOMETER

Filed Dec. 21, 1949

INVENTOR.
GERALD L. SCHWARZ
BY Walter C Kelsey

Patented Mar. 25, 1952

2,590,276

UNITED STATES PATENT OFFICE 2,590,276

FURNACE THERMOMETER

Gerald L. Schwarz, Cleveland Heights, Ohio

Application December 21, 1949, Serial No. 134,320

4 Claims. (Cl. 73—367)

This invention relates to thermometers, and more specifically to high temperature thermometers, capable of indicating heat in furnace stacks and the like, said device including indicating means serving to indicate whether the temperature in the stack indicates a normal condition or a wasted-heat condition for various types of furnaces.

It has been established that the operating efficiency of various types of furnaces and heaters may be ascertained by determining the temperature of the flue gases and the percentage of $CO_2$ gas content present. In the operation of heating furnaces it has been found that in commonly accepted standards of gas furnaces, the temperature of the stack gases is between 350° and 400° F., in oil furnaces between 550° and 650° F., while in coal furnaces the temperature should be between 600° and 700° F.

To facilitate the determination of stack gas temperatures I have provided a thermometer indexing means cooperating with the thermometer dial to indicate whether or not the temperature in the stack of a particular type of furnace, to wit, coal, gas, or oil, is normal or excessive.

It, therefore, is an object of my invention to provide a furnace thermometer having indexing means or indicia thereon to indicate whether the temperature of the stack gases, for furnaces operating with different types of fuels, is normal or excessive.

Other objects are to provide a relatively inexpensive thermometer which is of rugged construction, and is easily operated, which provides a quick and simple method of determining flue gas temperatures.

Other and further objects will appear in the course of the following description.

In the drawings forming a part of this specification:

Fig. 4 is a view of the indexing plate alone, while

Figure 1:
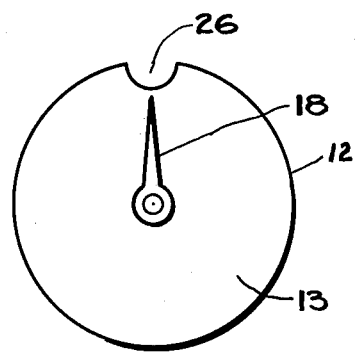
Fig. 1 is a plain view of the face of my thermometer without the indexing plate.
Figure 3:
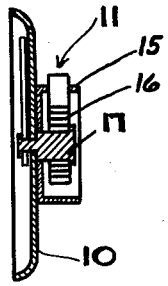
Fig. 3 is a vertical section taken on the line 3—3 of Fig. 2.
Figure 2:
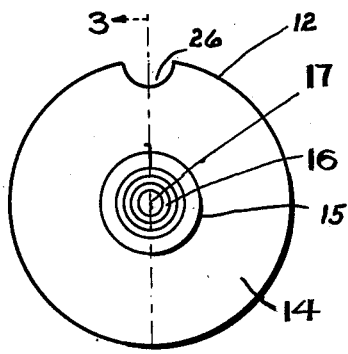
Fig. 2 is a rear view of the same.
Figure 4:
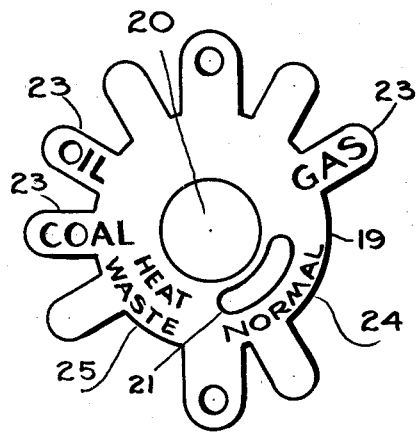

In the drawings the numeral 11 refers to my thermometer device, comprising a dish-shaped body 12, formed of steel by a drawing operation, having a face 13 and a back portion 14, while an open thermometer housing 15, projecting from the back 14 and suitably secured thereto as by welding, provides a container for a conventional bi-metallic thermometer comprising a flat coil 16 of suitable metal secured to a metallic pin 17 adapted to rotate in an aperture in the center of the body member 12, while an indicating pointer 18 is secured to the opposite end of the pin 17. As the above bi-metallic thermometer is well known in the art it is not considered necessary to describe the same in detail, it being sufficient to state that certain temperatures cause the coil 16 to unwind, and the pointer 18 obviously moves as the pin 17 rotates, in response to such movement.

Figure 5:
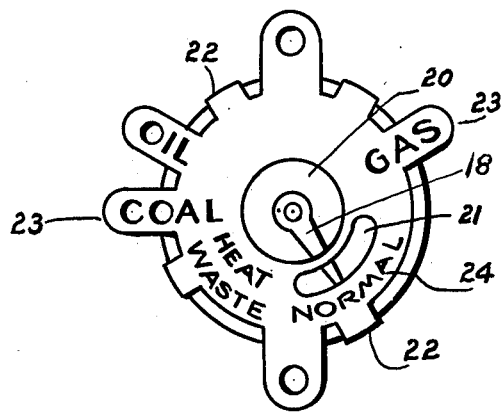
Fig. 5 shows the indexing plate mounted on the thermometer.

A flat circular index plate 19, adapted to cooperate with the face 13 is provided with a central aperture 20, an arcuate slot 21 and a series of radially extending tabs 22 which are adapted to be bent around the periphery of the body 12 as shown in Fig. 5. Preferably designative indicia, disposed radially, in proximity to certain tabs 22 includes the words "Coal," "Oil" and "Gas" 23 to indicate the types of furnace on which the thermometer is used, while the word "Normal" 24 is disposed near the arcuate slot 21 and the words "Heat Waste" 25 are disposed on another part of the plate 19. Obviously various indicia in addition to that shown herein may be used.

The index plate 19 preferably is made of flexible metal permitting the tabs 22 to be readily bent over the periphery of the body 12 as shown in Fig. 5, and when thus bent the tabs 22 hold the index plate 19 over the face 13 yet permit relative rotative movement between the body 12 and the index plate 19 for a purpose hereinafter explained.

The disposition and arrangement of the various indicia 23, 24 and 25, the slot 21 and the tabs 22 is such that the index plate 19 is adapted to be used as follows: If the device is to be used to determine the temperature in the stack of a gas furnace the radial tab 22 nearest the word "Gas" is centered in a peripheral slot 26 or bent thereover and the thermometer 11 is inserted in the stack of a gas furnace. If the thermometer 11 is to be used for successive reading of gas furnace stack temperatures it may be considered advisable to fold the tab over into the slot 26. After the thermometer 11 has remained in position for a sufficient length of time to properly register the heat in the stack, it is read. If the indicating pointer 18 has not passed the arcuate slot 21 having the word "Normal" disposed thereby it indicates the temperature is normal for such type of furnace. If, however, the indicating pointer 18 has passed beyond the slot 21, it indicates that the stack gases are too hot and should be remedied.

Obviously the same procedure may be followed when the device is selectively used with coal or oil furnaces; in such instances the insertion of the tabs nearest to the indicia "Coal" or "Oil" into the peripheral slot 26 will operate in a similar manner to indicate normal or excessive stack gas temperatures.

It will be obvious to those skilled in the art that the embodiment of my invention disclosed is illustrative only and that the invention may be changed, used or modified, without departing from the spirit of the invention or sacrificing the advantages thereof.

I claim:

1. In a thermometer of the type wherein a movable indicator registers the temperature on a dial, the combination with said thermometer of a movable indexing plate, adapted to be mounted over said dial and provided with a slot permitting the position of said temperature indicator to be observed, said dial being provided with a marginal notch and the periphery of said indexing plate being provided with arms adapted to be selectively seated in said dial notch, for the purposes described.

2. In a thermometer of the type wherein a rotatable indicator registers the temperature on a circular dial, the combination with said thermometer of an indexing plate, adapted to be mounted over said dial and provided with a slot permitting the position of said temperature indicator to be observed, and means for releasably clamping said indexing plate to the periphery of said dial in a manner permitting relative rotative movement between said dial and indexing plate, said dial being provided with a peripheral notch and said plate being provided with arms adapted to be selectively seated in said dial notch, for the purposes described.

3. A furnace thermometer comprising, a dial provided with a peripheral notch, a temperature responsive heat indicator movable on the dial, a movable indexing plate having arms extending outwardly from the periphery thereof, adapted to be mounted over said dial and provided with a slot permitting the position of said indicator on said dial to be observed, said arms being positioned and arranged in such manner as to permit an arm to be folded over into said dial notch, for the purposes described.

4. A furnace thermometer comprising, a dial provided with a peripheral notch, a temperature responsive heat indicator movable on the dial, a movable indexing plate having arms extending outwardly from the periphery thereof, adapted to be mounted over said dial and provided with a slot permitting the position of said indicator on said dial to be observed, said arms being positioned and arranged in such manner as to permit an arm to be folded over into said dial notch, and to permit said arms to be folded over the periphery of the dial, for releasably clamping the indexing plate to the dial.

GERALD L. SCHWARZ.

REFERENCES CITED

The following references are of record in the file of this patent:

UNITED STATES PATENTS

| Number | Name | Date |
| --- | --- | --- |
| 857,049 | Goehring | June 18, 1907 |
| 1,422,378 | Ryan et al. | July 11, 1922 |
| 1,692,551 | Harris | Nov. 20, 1928 |
| 1,827,930 | Bissell | Oct. 20, 1931 |